UNITED STATES PATENT OFFICE.

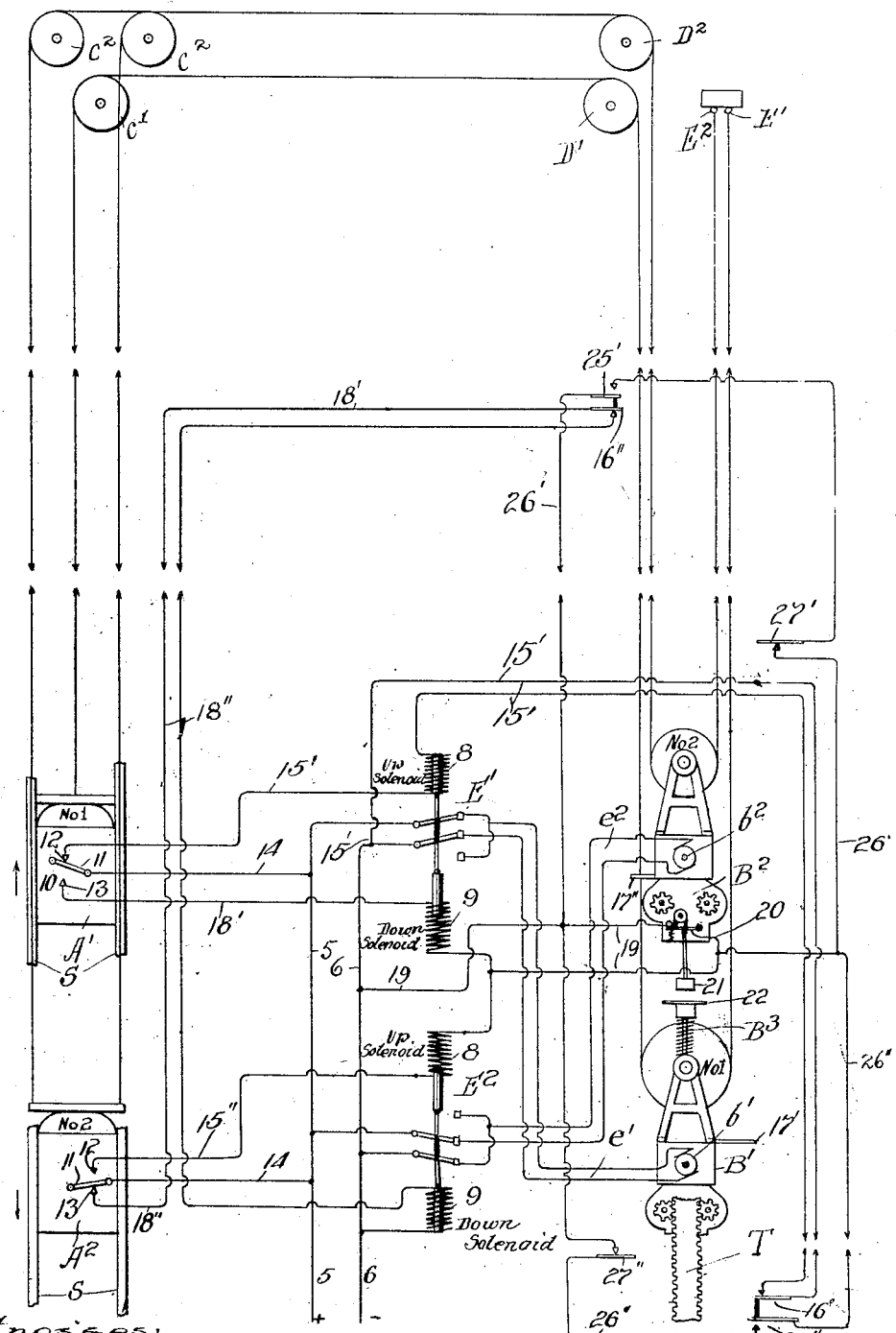

JOHN W. MABBS, OF CHICAGO, ILLINOIS.

ELEVATOR SYSTEM.

1,001,870. Specification of Letters Patent. Patented Aug. 29, 1911.

Application filed December 6, 1909. Serial No. 531,596.

*To all whom it may concern:*

Be it known that I, JOHN W. MABBS, a citizen of the United States, residing at Chicago, in the county of Cook and State of Illinois, have invented certain new and useful Improvements in Elevator Systems, of which the following is a specification.

My invention relates to improvements in elevator systems, and has for its object to provide an elevator system whereby a plurality of elevators may be operated in a single shaft with safety, and with practical elimination of all possibility of cars oppositely traveling in the common shaft meeting in transit.

Another object of my invention is to provide a simple and effective system of intercontrol of the cars and their motor parts, and other and further objects will become apparent to those skilled in the art from the following description taken in conjunction with the accompanying drawing, wherein I have illustrated in a single view a diagrammatic embodiment of my invention.

In the drawing, $A^1$ and $A^2$ indicate two cars, typical of a suitable plurality of cars, arranged to travel, in part at least, the same path in a common shaft. S, and $B^1$ and $B^2$ indicate corresponding counterweight motors connected with and actuating the cars each substantially in accordance with my prior Patent No. 657,782, dated Sept. 11, 1900, said motors being arranged for coöperation with a single racked track, T, likewise to travel, in part, the same path. The lower motor, $B^1$, is connected with the upper car, $A^1$, and vice versa, the cables of car No. 2 ($A^2$), being therefore arranged to run up the sides of the shaft to run over independent pulleys, $C^2$, and thence, preferably, in order to secure two-to-one gearing of the motors relative to the cars, over a common guiding sheave, $D^2$, around the sheave of the motor $B^2$, and back to a point of support, $E^2$, at the top of the motor shaft. Car No. 1 has its cables similarly run except that its cables may be connected centrally to the top of the car, and further that the sheave of the motor $B^1$ is of greater diameter than that of the upper motor $B^2$, so that the cables clear the upper motor. This arrangement broadly, providing the combination of a plurality of cars traveling in a single path and a like plurality of counterweights respectively therefor (preferably in the form of motors) traveling in a single path, with the counterweights arranged so that adjacent structures approach each other as their cars approach each other, I claim as a new and useful invention. It will be obvious that the arrangement of the counterweights, preferably in the form of electric motors for driving the cars, may be such that the adjacent counterweights will meet in transit before their cars could possibly come into collision. Therefore, the structure is such that collision between the cars is a physical impossibility, irrespective of any safety stops, or the like, as long as the cables and counterweights remain intact, the result of overrunning of the cars in opposite directions being a collision between the counterweight motors and not between the cars themselves. To minimize the possible effect of collision between the motors, a suitable buffer, $B^3$, is arranged on one motor for presentation toward the other. My system provides, however, automatic safeguards against collision of the motors, and means to this end I have schematically shown and will describe.

The motor parts of the counterweight motors, typified by the commutators, $b^1$ and $b^2$, have connections for control from the cars. Specifically, said commutators are connected by wire couples, $e^1$ and $e^2$, with the stationary contacts of the corresponding reversing switches, $E^1$ and $E^2$, the movable blades of which are respectively connected to the positive and negative wires, 5 and 6, of a feed circuit. Electro-responsive, or other convenient form of operating mechanisms for the reversing switches, $E^1$ and $E^2$, are controllable respectively from the cars $A^1$ and $A^2$, and the cars need have no other operating paraphernalia connected therewith or with their shafts, the safety devices, being preferably, for convenience of wiring, accessibility, etc., associated with the motors.

For convenient illustration, each reversing switch is shown as connected with opposing controlling solenoids, one an "up-solenoid," 8, for throwing the switch in such direction that the motor will propel the car upward, and the other a "down-solenoid," 9, for reversing the connections of the switch, thereby actuating the motor to cause the car to descend. It is to be understood that when neither solenoid is energized, the switch stands in open position, so that the motor is idle. Each car has thereon a controlling switch, 10, having a movable arm, 11, arranged for contact with an upper contact, 12, for cutting into circuit the up-solenoid or with a lower contact, 13, for cutting into circuit the down solenoid of the reversing switch appurtenant to such car.

To prevent the motors and consequently the cars from coming closer together than some definitely safe distance, means are provided for disabling the motors from approach, controlled by the proximity of the cars. To this end, circuit-breaking means for the proper controlling circuit of the reversing switches are provided in arrangement to open the circuit of the down-solenoid of the upper car and the up-solenoid of the lower when the motors approach within a determinate distance of each other. Further, limitation stops may conveniently be provided whereby the circuits of the up-solenoid of the upper car and the down-solenoid of the lower car may be opened when their respective motors reach their predetermined corresponding limits of travel, thereby to prevent the said cars from passing their respective upper and lower limits of movement. And further, automatic means may be provided, if desired for permitting the cars to travel closer to each other at certain points in their travel than is normally possible. Specific circuit arrangements capable of attaining these ends are shown as follows: The controlling switch upon the upper car $A^1$ has its movable contact 11 connected by wire 14 with the positive wire 5 of the line, and its upper contact 12 connected by wire 15' through the up-solenoid 8 of the appropriate reversing switch $E^1$ to the negative wire 6 of the feed circuit, said wire 15' including a circuit breaker, 16', arranged to be opened by an arm, 17', upon the counterweight motor $B^1$ for said car, when said motor reaches a predetermined lower limit of travel corresponding with the high limit of travel of the car. The lower contact 13 of the controlling switch upon the upper car $A^1$ is connected by wire 18' with the down-solenoid 9 of the reversing switch and beyond said solenoid is connected with a wire 19 extending to the negative wire 6 of the feed circuit and embodying the switch 20, arranged to stand normally closed, but to be opened when the motors approach within a certain distance of each other. For simplicity, said switch 20 is shown as a spring opening switch, normally held closed by a weight 21, overbalancing the spring, but arranged to be received upon a platform 22 upon the lower motor when the motors approach within a definite distance of each other, so that the release of the switch from the preponderance of the weight 21, enables said switch to open under the effort of its spring.

The controlling connections for the lower car are the reverse of those described, the wire 15" for the up-solenoid circuit connecting to the wire 19, so that said up-solenoid circuit is controlled by the automatic switch 20, and the wire 18" for the down-solenoid, directly bridging the feed circuit, but including therein a circuit-breaking switch 16", arranged to be opened by an arm, 17", upon the upper motor $B^2$, when the latter reaches its upper limit of travel.

Now it will be apparent that when the switches on the cars are thrown in the position shown in the drawing, the up-solenoid 8 of reversing switch $E^1$ receives current by a circuit, 5, 14, 11, 12, 15', 8, 16', 6, while similarly the down-solenoid of the reversing switch for car $A^2$, receives current by circuit 5, 14, 11, 13, 18", 16", 9, 6, so that the reversing switches are oppositely thrown to cause motor No. 1 to run toward the bottom of the shaft and raise its car No. 1 to the top of its shaft, while motor No. 2 runs toward the top of its shaft, and its car runs toward the bottom of the shaft. When either motor reaches its limit of movement in such direction, it opens its limitation switch, 16' or 16", opening the previously-closed solenoid circuit of the controlling switch of such motor, permitting the reversing switch to go to neutral position and stopping the progress of the motor and its car. When the positions of the controlling switches 10 are reversed from the positions shown in the drawing, the motors and cars respectively run toward each other, the down-solenoid of car No. 1 and the up-solenoid of car No. 2 receiving current through their respective circuits, 5, 14, 11, 13, 18', 9, 19, 20, 6, and 5, 14, 11, 12, 15". 8, 19, 20, 6, both said circuits being under the domination of the automatic switch 20. When the motors approach within such distance of each other that the weight 21 is lifted, the switch 20 springs open automatically, thereby instantly throwing out of service the previously active solenoids of both cars, and compelling both cars to come to a stand still. In practice, such automatic control might be arranged to take place when the cars were separated by a distance of two floors or more of the building, but such details will, of course, be regulated by the peculiarities of the installation. If it is desired, however, that the cars should be able to run closer together when both are at the bottom or top of their flights than at other times of their flights, provision may be made by the installation of short circuiting switches 25' and 25", in similar circuits, 26' and 26", arranged to shunt the switch 20, the ends of the wires 26' and 26" being connected to the wire 19 on opposite sides of said switch 20, and the short-circuiting switches 26' and 26'' being arranged respectively to be closed only when the upper motor No. 2 is at the top of its flight and the lower motor No. 1 is at the bottom of its flight. Thus when the car No. 1 is at the top of its shaft, or car No. 2 at its lower limit, the switch 20 is disabled to perform its function of cutting the solenoids, normally controlled thereby, out of circuit, and the car in flight may continue to approach closer to the car which is at its limit than is ordinarily possible. As a measure of safety, however, I prefer to provide limit switches 27' and 27'' in the shunts 26' and 26'', respectively arranged to be opened by the stops 17' and 17'' of the motors No. 1 and No. 2, when they are respectively at their upper and lower limits of movement, so that, under the conditions previously described, where one car is at the extremity of the shaft and the other car is approaching, said second mentioned car cannot come closer to the stationary car than the next floor. It may also be provided that the motor $B^2$ is just touched by the buffer $B^3$ when the cars are thus separated. It will be observed, however, that when the cars are stopped in flight by the opening of their switch 20, either car may recede from proximity to the other, as the down-solenoid of the lower car and the up-solenoid of the upper car are not in any way affected by the switch 20, and that such recession results in re-closing of switch 20.

It will be understood that in practice the upper car may run as an express from the first floor to the middle floor of the building and from there up as a local, while the lower car may travel locally between the basement and the middle floor of the building, the lower car dropping to the basement, while the express car stands at the first floor to load, and the lower car taking on passengers while the express car is taking its express run to its first stop.

While I have herein described in some detail a particular embodiment of my invention, it will be understood by those skilled in the art that numerous changes might be made in the construction and details of the arrangement without departure from the invention and within the scope of the appended claims.

What I claim is:

1. The combination of a plurality of elevator cars arranged to travel in vertical alinement over a common path, counterweight structures therefor arranged to travel in vertical alinement over a common path, the counterweight structures being arranged for relative approach and recession in harmony with the relative approach and recession of the cars.

2. The combination of two elevator cars arranged to travel in vertical alinement in the same path, counterweight structures therefor, arranged to travel in vertical alinement in another path, the counterweight structures being arranged for relative approach and recession in harmony with the relative approach and recession of the cars, said counterweight structures being connected with their cars to maintain the cars separated when the counterweight structures meet in contact.

3. The combination of a plurality of elevator cars arranged to travel in vertical alinement in the same path, counterweight motors arranged to travel in vertical alinement in another path, the counterweight motors being arranged for relative approach and recession in harmony with the relative approach and recession of the cars, and controlling means for each counterweight motor upon its respective car.

4. The combination of a plurality of cars arranged to travel in vertical alinement in the same path, counterweight motors therefor, arranged to travel in vertical alinement in another path, the counterweight motors being arranged for relative approach and recession in harmony with the relative approach and recession of the cars, said counterweight motors being connected with their cars to maintain the cars separated when the counterweight motors meet in contact, and controlling means upon each car for the respective counterweight motor.

5. The combination of a plurality of elevator cars arranged to travel in vertical alinement in the same path, counterweight structures therefor arranged to travel in vertical alinement in another path, the counterweight structures being arranged for relative approach and recession in harmony with the relative approach and recession of the cars, said counterweight structures being connected with their cars to maintain the cars separated when the counterweight structures are in contact, and buffing means interposed between said counterweight structures.

6. The combination of a plurality of elevator cars arranged to travel in vertical alinement in the same path, counterweight electric motors therefor, arranged to travel in vertical alinement in another path, the counterweight motors being arranged for relative approach and recession in harmony with the relative approach and recession of the cars, reversing means for each said counterweight motor, and controlling means for each reversing means including a controlling switch on the appropriate car.

7. The combination of a plurality of elevator cars arranged to travel in vertical alinement over the same path, counterweight motors therefor arranged to travel in vertical alinement in another path, the counterweight motors being arranged for relative approach and recession in harmony with the relative approach and recession of the cars, a switch for potentiating each of said counterweight motors to move its car either up or down, and switch-means for disabling the upper counterweight motor for upward movement and the lower motor for downward movement, operable respectively upon the approach of the upper motor to its top limit of travel and the lower motor to its bottom limit of travel.

8. The combination of a plurality of elevator cars arranged to travel in vertical alinement over the same path, counterweight electric motors therefor arranged to travel in vertical alinement in another path, the upper counterweight motor being associated with the lower car, and vice versa, a switch for controlling the operation of each said motor in either direction; and means, associated with the counterweight motors, operable upon predetermined proximity thereof, for disabling the upper counterweight motor for downward movement and the lower counterweight motor for upward movement.

9. The combination of a plurality of elevator cars arranged to travel in vertical alinement over the same path, counterweight motors therefor arranged to travel in vertical alinement in another path, the counterweight motors being arranged for relative approach and recession in harmony with relative approach and recession of the cars, means operable upon predetermined proximity of the cars for disabling the upper counterweight motor for downward movement and the lower counterweight motor for upward movement, and means determinately operable to disable the first said means.

10. The combination of a plurality of elevator cars arranged to travel in vertical alinement over the same path, counterweight electric motors therefor arranged to travel in vertical alinement in another path, the counterweight motors being arranged for relative approach and recession in harmony with the relative approach and recession of the cars, a switch operable upon predetermined proximity of the cars for disabling the upper counterweight motor for downward movement and the lower counterweight motor for upward movement, and means operable upon predetermined relation of the cars and shaft for disabling the motor-disabling switch.

11. The combination of a plurality of elevator cars arranged to travel in vertical alinement over the same path, counterweight electric motors arranged to travel in vertical alinement over another path, the counterweight motors being arranged for relative approach and recession in harmony with relative approach and recession of the cars, a switch for controlling the operation of each motor in both directions, a switch operable upon predetermined proximity of the motors for disabling the motors for further approach, and means, operable upon the approach of the upper counterweight motor to its top limit of travel for disabling the motor-disabling switch.

12. The combination of a plurality of elevator cars arranged to travel in vertical alinement over the same path, counterweight electric motors arranged to travel in vertical alinement over another path, the counterweight motors being arranged for relative approach and recession in harmony with relative approach and recession of the cars, a switch for controlling the operation of each motor in either direction, a switch operable upon predetermined proximity of the motors for disabling the motors for further approach, and means operable upon the approach of the upper counterweight motor to its top limit of travel for disabling the motor-disabling switch, and means for disabling the last said means when the lower counterweight is within a predetermined distance from the so-positioned upper counterweight motor.

13. The combination of a plurality of elevator cars arranged to travel in vertical alinement in a common path, counterweight motors therefor arranged to travel in vertical alinement in another common path and arranged for relative approach and recession in harmony with the relative approach and recession of their cars, and means for disabling the motors from further approach than a predetermined distance from each other, arranged constantly to permit recession of the motors.

14. In an elevator, the combination of a shaft, two cars independently operable therein either upward or downward either toward or from each other, distancing mechanism to automatically prevent the approach of the cars within a predetermined distance of one another, means whereby when the lower car is at its lower limit of travel said distancing mechanism will be automatically disabled, to allow the upper car to approach to a shorter predetermined distance of the lower car, and means to automatically prevent the approach of the cars within said shorter predetermined distance.

In testimony whereof I hereunto set my hand in the presence of two witnesses.

JOHN W. MABBS.

In the presence of—
W. LINN ALLEN,
MARY F. ALLEN.